(No Model.) 4 Sheets—Sheet 1.
J. TOBIN.
SCALE AND BRISTLE DETACHING MACHINE.

No. 493,454. Patented Mar. 14, 1893.

Witnesses.
E. T. Wray.
J. Elliott.

Inventor.
John Tobin
By Burton and Burton
his Attys.

(No Model.) 4 Sheets—Sheet 2.

J. TOBIN.
SCALE AND BRISTLE DETACHING MACHINE.

No. 493,454. Patented Mar. 14, 1893.

Witnesses.
E. T. Wray.
J. Elliott

Inventor,
John Tobin
By Burton and Burton
his attys

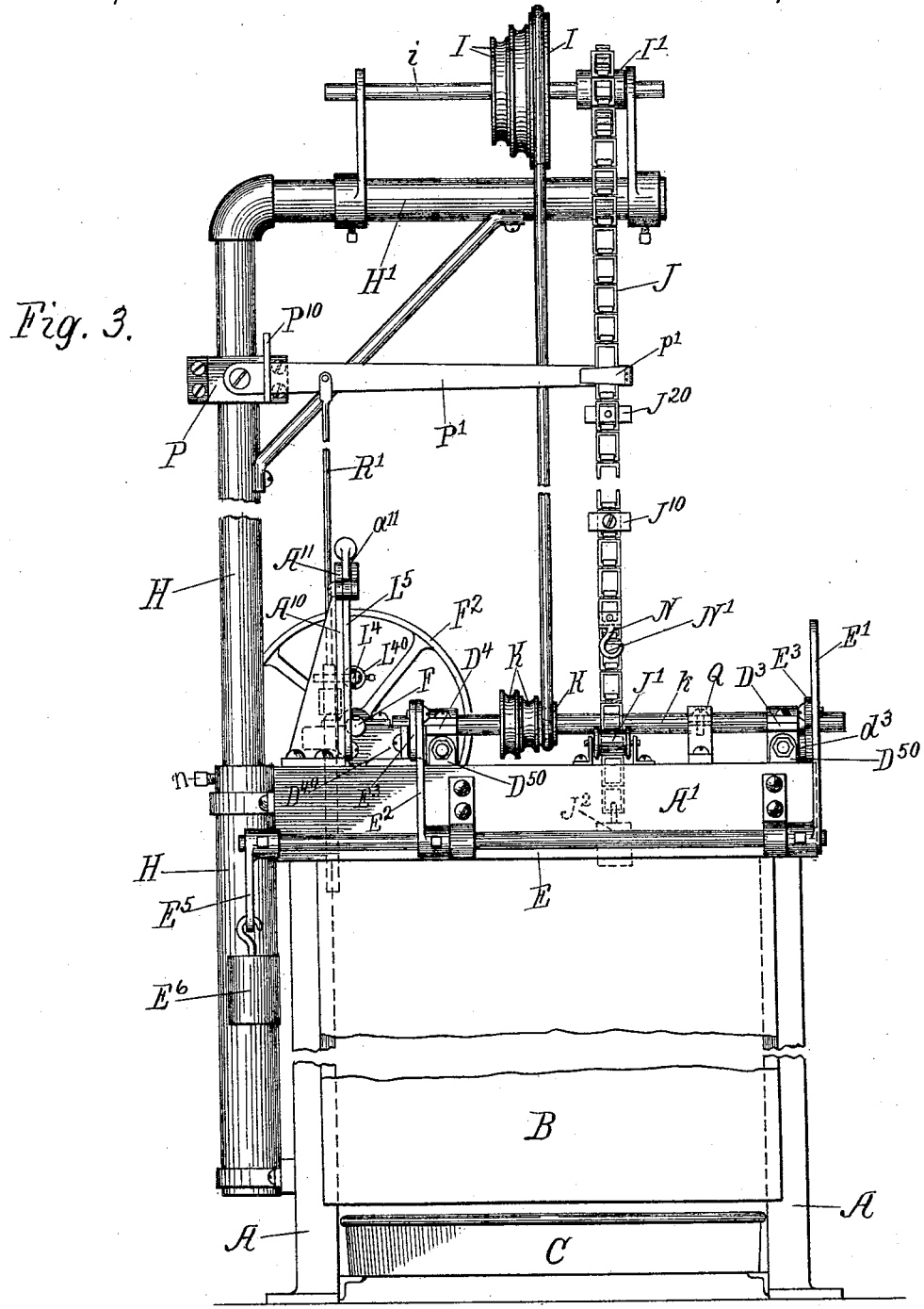

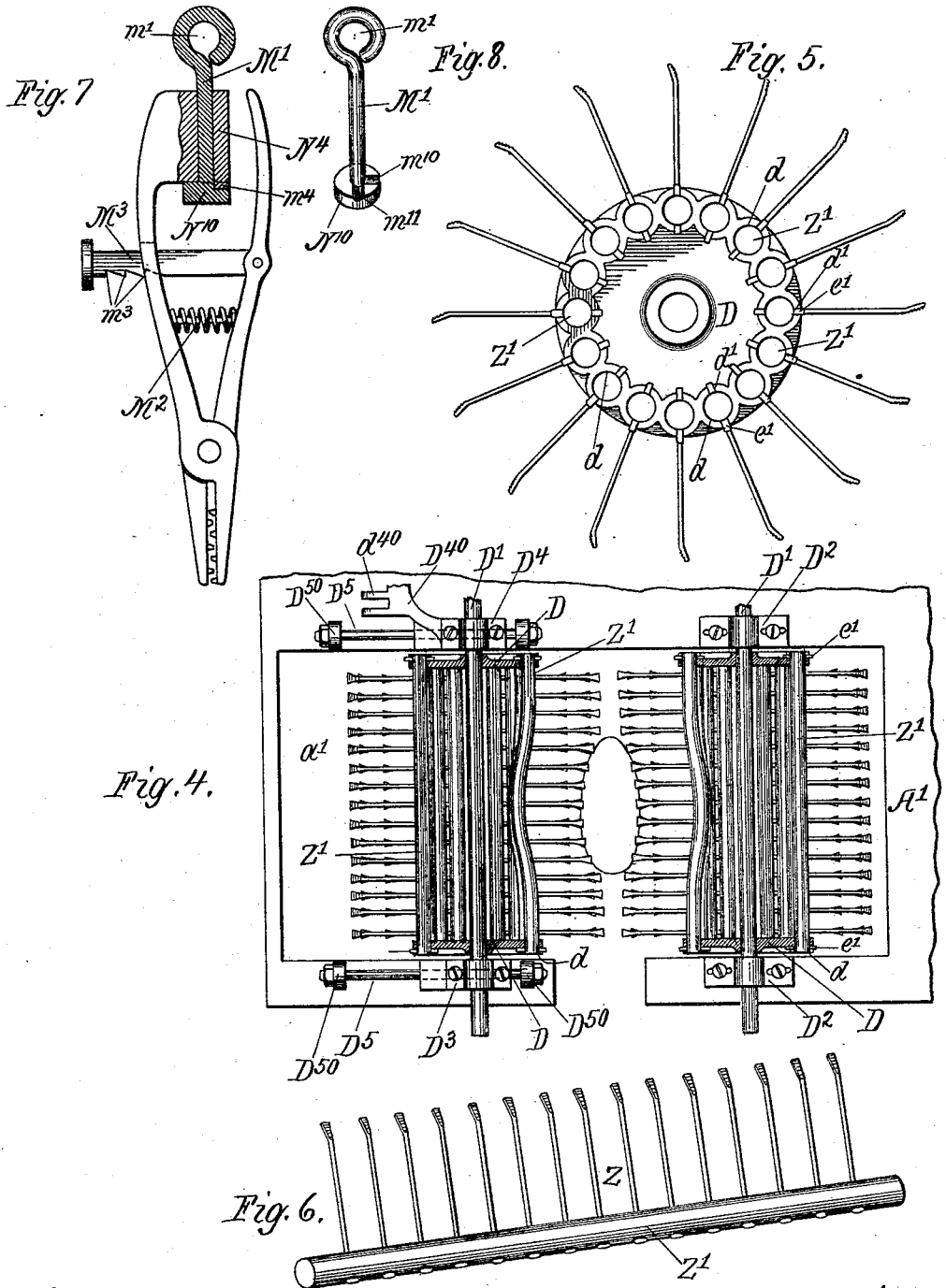

UNITED STATES PATENT OFFICE.

JOHN TOBIN, OF CHICAGO, ILLINOIS, ASSIGNOR OF ONE-HALF TO PAUL J. DAEMICKE, OF SAME PLACE.

SCALE AND BRISTLE DETACHING MACHINE.

SPECIFICATION forming part of Letters Patent No. 493,454, dated March 14, 1893.

Application filed July 11, 1892. Serial No. 439,660. (No model.)

*To all whom it may concern:*

Be it known that I, JOHN TOBIN, a citizen of the United States, residing at Chicago, county of Cook, and State of Illinois, have invented certain new and useful Improvements in Scale and Bristle Detaching Machines, which are fully set forth in the following specification, reference being had to the accompanying drawings, forming a part thereof.

The purpose of this invention is to provide mechanism for detaching the scales from fish and the bristles from hogs, and for other analogous uses.

Figure 1:
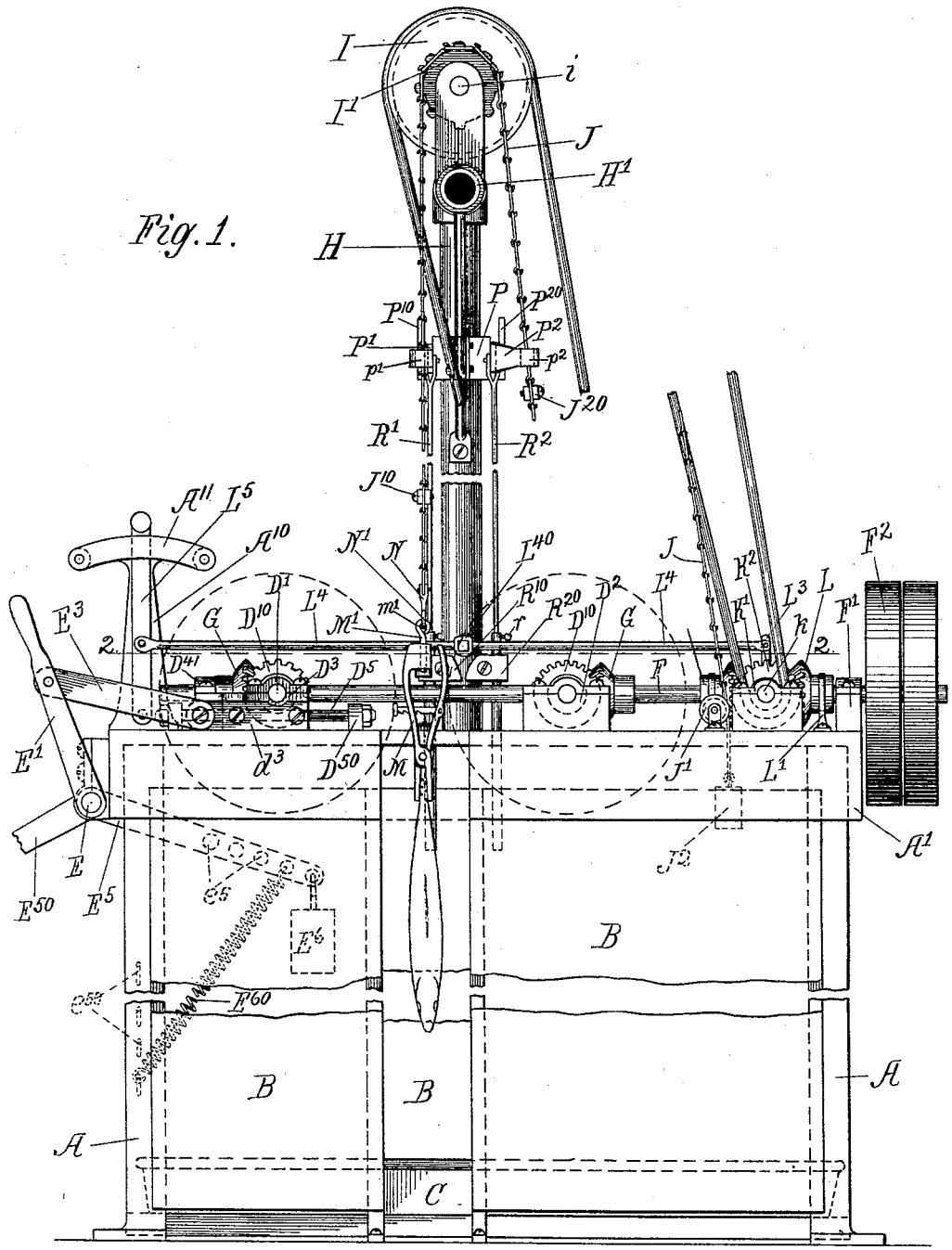
Figure 9:
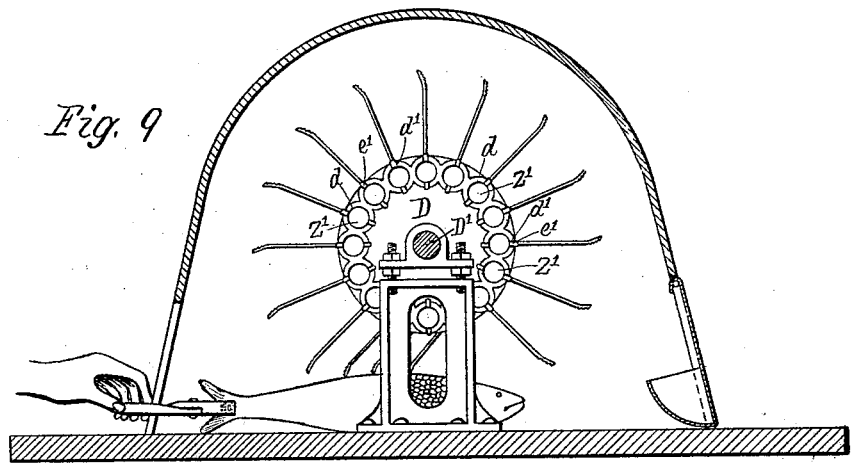
Figure 2:
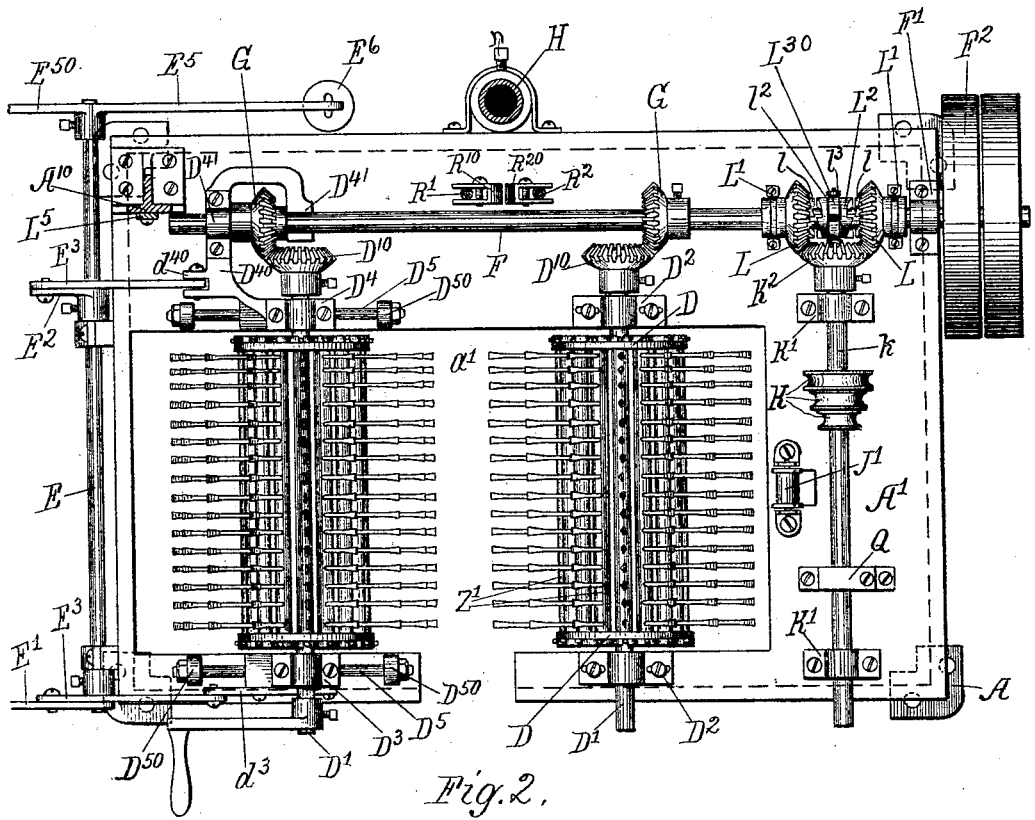

In the drawings, Figure 1 is a front elevation of a compound machine,—that is, having a double set of the scale or bristle detaching brushes, the position only of said brushes being shown in dotted outline, the brushes themselves, in detail, being omitted from the view. Fig. 2 is a sectional plan of the machine, the brushes being included in the view, section being made at the line 2—2 on Fig. 1, the hoisting strap or chain being omitted. Fig. 3 is an end elevation, the brushes and their driving gear train being omitted. Fig. 4 is a horizontal sectional detail of the brushes and their immediate bearings, shown in the position and condition of use with a fish (represented in outline), between them and subject to their action, section being made through the brushes at the horizontal plane of their axes. Fig. 5 is an end elevation of one of the rotary brushes. Fig. 6 is a perspective of one of the combs, a number of which are assembled in circular order to constitute the brushes. Fig. 7 is a sectional side elevation of a gripper by which the fish or other object to be subjected to the action of the machine is grasped and drawn through the machine, section being made axially with respect to the suspending swivel to show the arrangement of the latter. Fig. 8 is a perspective of the swivel for suspending the gripper. Fig. 9 is a longitudinal section of a form of the device containing but a single rotary brush, and mounted upon the base on which the fish is intended to rest while being subjected to the action of the machine, being such a form as would be adapted to domestic use.

The primary feature of this invention is a device which I call a "comb," which consists of a flexibly and torsionally elastic back or rib, having rigid teeth set into it projecting from it, adapted to engage and detach the scales or bristles. The yielding character of the comb back, and particularly its character as adapted to yield both flexibly and torsionally, makes it suitable in an especial manner for the purpose to which it is applied, because, thereby, each tooth may yield to a greater or less extent, according to the shape of the object subjected to the action of the device, and every point of the surface of the latter may thus be reached with a yielding but persistent pressure of the scale-detaching teeth, so that the scales or bristles will be scraped or torn off without the application of greater force than necessary, and without the application of materially greater force at any one point or by any one tooth than at any other point or by any other tooth, although, of course, the more protruding portions do, in fact, experince somewhat greater pressure.

As the most effective means of employing the primary implement, which I term a "comb," for the purpose in view, I organize a number of such combs into a rotary brush, the backs of the combs being parallel to the axis of rotation of the brush, and the teeth, in the normal condition of the combs, projecting substantially or approximately radially with respect to said axis; such a brush being mounted in proper bearings and retained against the object to be cleaned,—fish or hog,—the latter being in any suitable manner held in position subject to the action of the rotary brush, and moved longitudinally past it,—that is, tangentially with respect to the rotation of the brush and in a contrary direction with such rotation. For use on an extended scale, and particularly when employed for detaching bristles from hogs or scaling large fish, I provide a pair of such rotary brushes, each of which constitutes the means of holding the animal against the other, while they are both rotated and both sides of the animal subjected to the cleaning operation at once; and in connection with such an organization I prefer to provide an automatic device for holding the animal, which, in that event, is moved vertically between the brushes as the latter revolve.

The principal drawings represent the machine organized in the manner last above indicated, the more simple form, involving a single rotary brush, being, however, illustrated in Fig. 9.

A A A are posts and bars of the rigid frame, which supports the mechanism. The corner posts of this frame may be connected by sheathing plates of metal or wood B B, thereby constituting a case around the lower part or extending downward from the brushes which are mounted upon the top of the frame as hereinafter set forth.

C is a pan or tray, supported between the four corners of the frame for the purpose of receiving the scales or bristles as they are detached and thrown downward by the motion of the brushes.

D D are the heads or end disks of the rotary brushes, which comprise, in addition to said heads, the combs Z Z, secured in them in the manner shown in the drawings,—that is to say, the back or rib $Z'$ of each comb being inserted through one of the apertures $d$ in the heads D, is therein secured by a linchpin $e'$, inserted through the protruding end of the comb back, and lodged in the notches $d'$ formed in the outwardly protruding bosses which encircle the aperture $d$, whereby the combs are prevented from longitudinal displacement and also from rotation bodily in the apertures in which they are secured in the heads, so that torsion of said comb backs will result from resistance experienced by the teeth of the combs as the brush revolves. The comb backs $Z'$ are preferably made of cylindrical rubber rods, so that they have both flexile and torsional elasticity. The teeth of the combs may be made of any rigid material, but metal wire is suitable, and a desirable form is that shown in the drawings, wherein the end of each tooth is slightly bent and the convex side is serrated. As ordinarily used, the convex serrated side of the tooth is the operative side which comes into contact with the object subjected to the action of the device, but in special instances, the direction of rotation may be reversed and the forwardly pointing end of the tooth may become the operative point, attacking the bristles or scales more aggressively than the serrated convex side or heel. The heads D of the rotary brushes are made rigid with their shafts $D'$ respectively, and one of them is mounted in bearings $D^2 D^2$, which are fixed with respect to the supporting frame, being mounted upon the upper plate $A'$, which has the oblong aperture $a'$, through which the two brushes project and in which they operate. The other of the two rotary brushes has its shaft mounted in bearings which are movable horizontally toward and from the other brush. At the forward side, $D^3$ represents such adjustable journal bearing. At the rear side, a corresponding bearing $D^4$ is formed in a yoke $D^{40}$, which contains other bearings hereinafter described. Said journal bearings $D^3$ and $D^4$ are similarly mounted upon horizontal rods $D^5 D^5$, made fast in lugs $D^{50} D^{50}$, which project upwardly from the top plate $A'$, the lower half of the journal boxes $D^3$ and $D^4$, below the shaft bearing, being pierced transversely to the direction of the shaft, so that said journal boxes may be mounted on the rods $D^5$, as stated, and be adapted to slide thereon.

For the purpose of sliding these bearings and journal boxes equally, and thereby keeping the shaft bearings in line, I provide a rock shaft E, mounted on the frame below the level of the upper surface of the top plate, and to said shaft I secure lever arms $E' E^2$, which extend upward, and are connected by links $E^3 E^3$ to the journal boxes $D^3$ and $D^4$ respectively. The forward lever arm $E'$ is extended to form a handle by which the shaft E may be rocked and thereby equal movement given to both the links and both the journal boxes. On the rear end of the shaft E, I secure lever arms $E^5$ and $E^{50}$, projecting respectively inward and outward, and upon one or the other of said lever arms I hang the weight $E^6$, or connect the spring $E^{60}$ the other end of which is connected to the frame below the shaft, the tendency of which, as will be seen, is to rock the shaft in one direction or the other, according as the weight or spring is connected to one arm or the other, so that the movable brush may be held yieldingly either toward or away from the other brush. The degree of pressure which will be exerted when it is held toward the other brush and against the object which is being operated upon between the brushes, may be regulated by varying the point of suspension of the weight or spring to the lever arm $E^5$. In some instances, it will be found preferable to make the connection so that the movable brush shall be held away from the other brush and may be forced toward it against the fish or other object at the will of the operator, and with such varying or constant pressure as the case may require. But in other instances, the spring or weight may preferably be so connected as to afford the desired pressure upon the object being operated upon, such pressure being relaxed or discontinued at the will of the operator by forcibly withdrawing the brush.

Eyes $e^5$ in the lever arm, afford means for varying the point of suspension or connection of the spring, and the tension of the spring may be further varied by changing its point of connection on the frame, several hooks $e^{50}$ being provided at different points for that purpose.

The connection of the links $E^3 E^3$ to the journal boxes $D^3$ and $D^4$ respectively, is slightly different, corresponding to the different form of the boxes, the connection to the forward box $D^3$ being made by bolting onto the forward side of the box a bar $d^3$, which projects outward to the proper point to afford pivotal attachment for the link. The rear box $D^4$, being formed on the bracket $D^{40}$, said bracket has suitable lugs $d^{40}$, to which the rear link is pivotally connected.

For the purpose of rotating the brushes, and communicating equal and opposite rotary motion to them to adapt them to act in the same direction upon opposite sides of the body subjected to their action, I provide the train of gearing which I will now describe:— At the rear of the brushes, on the top plate $A'$, are mounted journal bearings for the shaft F, located in the horizontal plane of the shafts of the brushes and at right angles to said shafts. The yoke or bracket $D^{40}$ has two bearings $D^{41}$ $D^{41}$ for the shaft F, between which, on the shaft, there is located the beveled gear G, which meshes with and drives the beveled gear $D^{10}$, which is made fast at the rear end of the shaft $D'$ of the movable brush. A bearing for the shaft F, at the opposite end, is obtainable in a journal box $F'$, mounted at the edge of the top plate $A'$. Another beveled gear G is made fast on the shaft F at suitable position to engage with and drive the beveled gear $D^{10}$ of the fixed brush. The two gears G are equal, and the two gears $D^{10}$ are equal, and the beveled gears G, being faced in opposite directions and engaging the gears $D^{10}$, therefore, on the opposite sides, give to the brushes rotary motion in opposite directions,—that is to say, their tangential movement at their proximate sides is the same. Power is applied to rotate the shaft F by means of a suitable pulley $F^2$, secured to the shaft at any convenient point, as outside the journal box $F'$. When it is desired to reverse either brush to cause the teeth to act by their points instead of by their serrated heels, the bevel gear on the brush shaft may be changed to the opposite end of the shaft and the brush then reversed end for end in its bearings.

The construction thus far described may be operated without addition thereto, but would require that the operator draw or push the object to be operated upon vertically between the brushes while they were being rotated. This would be in many cases inconvenient, and I prefer, therefore, to provide, as a part of the mechanism, means for forcibly moving the fish or other object in the direction between the brushes necessary to subject it to their action. The mechanism for this purpose I will now describe:—To the rear of the machine, there is suitably made fast an upright post H, having a horizontal arm $H'$ at its upper end, overhanging the frame or table in which the revolving brushes are mounted, and on said arm I mount in suitable bearings a shaft $i$, having fixed upon it a set of pulleys I I I, of graduated sizes for the purpose of varying the speed, and also a sprocket wheel $I'$, and over which the chain J runs in a vertical plane which will pass between the two brushes (though this precise position is not essential), the other end of the chain being deflected through an opening in the top of the table, at the edge of which a guide roller $J'$ is suitably journaled, over which the chain runs and from which it hangs freely, being provided, if necessary, with a weight $J^2$, to keep it taut. The shaft $i$ is driven by a band passing over one of its pulleys I, and one of the corresponding set of pulleys K K K which is fixed on the horizontal shaft $k$, journaled in the bearings $K'$ $K'$ on the top of the top plate $A'$ of the frame. To the rear end of the shaft $k$, I make fast a bevel gear $K^2$, and loose on the shaft F, and in bearings $L'$ $L'$, secured to the top plate $A'$, I journal two equal bevel gears L L, facing each other and meshing with the opposite sides of the bevel gear $K^2$. The hubs of the bevel gears L L, at the ends facing each other, are provided with the clutch teeth $l$ $l$, and between said bevel gears, on the shaft F, there is feathered, so as to revolve with but slide on said shaft, the double clutch $L^2$, having clutch teeth adapted to engage the clutch teeth on the hubs of the gears L L respectively. The distance between the toothed hubs of the bevel gears, relatively to the length of the clutch $L^2$, is such that the clutch may stand out of engagement with both of the beveled gears. This clutch is of simple construction in respect to the devices for sliding it on the shaft to which it is feathered. It has an annular groove $l^2$, and is provided with a fork $L^3$ which strides the collar overhanging the groove, and is pivoted at the lower end to upstanding lugs $l^3$ on the top plate $A'$, and is provided with inwardly projecting studs $L^{30}$ $L^{30}$ from the branches of the fork, respectively, taking into the groove, so that said fork, being rocked over its lower pivoted ends, shifts the collar by the engagement of the said studs in the groove.

For the purpose of tilting the fork and shifting the collar, I provide the horizontal rod $L^4$, pivotally connected to the upper end of the fork $L^3$, and extending toward the opposite end of the frame, where it is connected to the lever $L^5$, fulcrumed on the frame and adapted to be rocked in a vertical plane longitudinally with respect to the frame, and thereby to rock the fork $L^3$. A post $A^{10}$ is secured to the top plate $A'$, to afford a fulcrum for the lever arm $L^5$, and a slotted cross arm $A^{11}$ at the top of said post, in whose slot $a^{11}$, the lever arm $L^5$ plays, and which serves as a gage by which it may be set at intermediate position, being the position at which the lever $L^5$ is vertical.

To the end of the chain J, which hangs over the interval between the revolving brushes, there is secured the gripper M. For this purpose a clip N is fastened to the end of the band and has, at the lower end, an eye $N'$, and the upper end of one member of the gripper is provided with a swivel $M'$, having the eye $m'$ adapted to interlock with the eye $N'$ of the clip. The gripper is a device of the nature of a pair of tongs or pinchers, whose jaws are provided with teeth adapting them to engage securely the object to be operated upon, a spring $M^2$ being interposed between the two members, tending to force them apart, and a latch $M^3$ being provided, pivoted to one member, and adapted to engage the other at any one of the several notches $m^3$, to hold the two jaws together or in engagement with the object which may be gripped between them. The swivel $M'$ extends vertically through an enlargement $N^4$ at the upper end of one of the members of the tongues. Said enlargement has, at its lower end, a projection or bead $m^4$, extending radially with respect to the aperture through which the swivel extends vertically, and the lower end of the swivel has a head $N^{10}$, having upon its upper face two radial recesses $m^{10}$ and $m^{11}$, at ninety degrees apart. When the bead $m^4$ at the lower end of the enlargement $N^4$ of the gripper handle, is lodged in the recess $m^{10}$ of the swivel head, the pintle of the gripper jaws is parallel with the shafts of the brushes, and the object, as, for example, the fish shown in the drawings, is held so as to present its two broad sides to the action of the brushes. If the gripper be turned on the swivel so as to lodge the bead $m^4$ in the recess $m^{11}$ of the swivel head, the object held in the jaws of the gripper will be turned ninety degrees from its former position, and will present, therefore, to the brushes, the two edges or sides which were not presented in the first position.

It is designed in operating this machine that the fish or other object shall be grasped in the grippers while the latter are at the position shown in Fig. 1, and after the grippers have been drawn up far enough to take them substantially out of range of the action of the brushes, which might be unnecessarily worn and wear the grippers, (if allowed to act against them,) the lever $E'$ shall be operated by hand to slide the left-hand brush over, forcing the right hand brush into position to cause the fish or other object to be grasped between the two brushes, the clutch being shifted into engagement with the left-hand gear wheel L, for the purpose of giving the grippers and thereby the fish or other object, the upward movement between the brushes, which are, at the same time, being revolved downward at their proximate sides,—that is, contrary to the upward movement of the fish, which is exposed between them to the action of both, and that, after the entire length of the fish has been passed upward between the brushes, the gripper will be turned a quarter way round, and the bead $m^4$ lodged in the recess $m^{11}$ of the swivel head, and then the position of the clutch being shifted to bring it into engagement with the right-hand beveled gear L, the direction of rotation of the shaft $k$ and the sprocket wheel $I'$ being reversed, the gripper and fish therein will be passed downward between the brushes, which, since they revolve downward at their proximate and operative sides, will assist the downward movement of the fish, which, being restrained by the relatively slow movement of the strap or band which is controlled by its engagement with the sprocket wheel, will notwithstanding its downward movement be subjected to very effective scratching or scraping action of the brush teeth during its entire descent. The broader sides of the object, whether a fish or other body, are preferably exposed to the brushes during the upward movement, leaving but little surface to be exposed during the downward movement because of the difference in the effectiveness of the brushes in the two movements, (the actual relative movement between the fish and the brush while the former is moving upward, being the sum of the vertical movement of the fish and the tangential movement of the brush, whereas, in the downward movement, the actual relative movement is the difference between said vertical and said tangential movements.) This difference is, however, to a large extent, and, in many cases, wholly, compensated by the fact that the teeth are deflected farther by the downward movement, during which the greater of the two transverse dimensions of the object extends between the brushes, so that the torsional and flexile reaction of the elastic backs of the combs is developed to a greater extent, and causes the teeth to operate with more severe pressure upon the object.

The shifting of the clutch, and the reversing of the feeding movement, may be effected wholly by hand, but I prefer that the disengagement at the end of each movement be effected automatically but by means of devices which may be adjusted according to the length of the object, so that it may not occur too soon and leave the process incomplete, nor be deferred too late, and needlessly delay the reverse movement and prolong the process. For the purpose of such automatic shifting, I provide the levers $P'$ and $P^2$, which are fulcrumed on the upright post H, and have a slight range of vertical movement in loops $P^{10}$ and $P^{20}$, which are secured to the post. These levers, at their outer ends, are provided with the eyes $p'$ and $p^2$, respectively, through one of which, the left hand or vertical ply of the chain J passes, while the oblique or right hand ply passes through the other, and on the chain are movably clamped at suitable positions the knots $J^{10}$ $J^{20}$. To these levers, at a short distance forward of the check loops, $P^{10}$ and $P^{20}$, there are pivotally connected the rods $R'$ and $R^2$, respectively, which extend down through the top plate, in which they are guided vertically, and to said rods there are secured, respectively, the cam blocks $R^{10}$ and $R^{20}$, which, in the vertical movement of the rods $R'$ and $R^2$, pass close to the horizontal rod or link $L^4$, and the latter is provided with an abutment $L^{40}$ projecting horizontally between the planes of said cam blocks, and the latter are provided at their proximate ends with a bevel facing upwardly toward the said abutment, which, when the clutch is at one limit of its movement,—in engagement, for example, with the left hand gear wheel L,—is in the vertical path of the said bevel of the left hand cam block $R^{10}$, so that the upward movement of said cam block will bring its bevel against the said abutment on the rod $L^4$, and impel the rod endwise toward the right, shifting the clutch out of engagement with the left hand gear wheel, and leaving the clutch disengaged between the gears so that the further rotation of the shaft $k$, and further upward movement of the fish, is checked, and the operator can then turn the gripper ninety degrees to the second position on the swivel, and then, by means of the lever $L^5$, can throw the clutch over still farther to the right, and bring it into engagement with the right hand gear L, through which the shaft $k$ will receive rotation in the opposite direction, and will lower the fish, now turned a quarter around from its first position between the brushes which are still revolving in the same direction as before, until the knot $J^{20}$ encounters the eye at the arm of the lever $P^2$ and pulls up the rod $R^2$, whose cam block $R^{20}$, by its beveled left hand end, operates upon the abutment $L^{40}$ on the rod $L^4$, and impels the latter endwise toward the left, bringing the clutch into intermediate position between the gears and arresting the feeding movement, thereby permitting the operator to detach the fish and attach the next object to be operated upon, and then, by the lever $L^5$, to re-engage the clutch with the left hand gear and repeat the operation.

It is desirable that the pulley I should stand no higher than necessary to allow proper range of movement below it, but that it should be capable of adjustment to any height necessary to accommodate objects of different size which may be subjected to the action of the machine, and I, therefore make the post H in two sections, the upper of which telescopes in the lower, which is fixed in the frame of the machine, a suitable set bolt $n$ being provided to secure it when adjusted. Also, the fulcrum block P of the levers P′ and $P^2$, may be adjusted on the post, said fulcrum block being made in two parts bolted together and thereby clamped to the post, as illustrated. The rods R′ and $R^2$ obtain guidance at their lower ends in apertures in which they pass through the top plate A′, and said rods are each made in two sections, the upper of which telescopes into the lower and is adapted to be secured as adjusted by the set nut $r$. The cam blocks $R^{10}$ $R^{20}$ are also adjustably clamped onto the rods R′ and $R^2$, respectively, so that the position of the various parts may be relatively adjusted to accommodate their action to the size of the object operated upon or the length to which it is necessary to move it vertically in order to operate upon it.

Q is a brake device, which operates upon the shaft $k$, consisting of the two-part friction box secured to the top-plate A′, and adapted to have its two parts more or less tightly clasped together upon the shaft to check its speed, as may sometimes be necessary in order to retain the object longer in the presence and subject to the action of the brushes in order to properly clean it and to control the chain when the clutch is disengaged. Any familiar form of brake, applied to the shaft $k$, will serve the purpose.

The sliding journal boxes of the left hand brush, in addition to their bearing and guidance of the horizontal rods, preferably rest upon the flat upper surface of the top-plate A′, so that the rods do not take all the weight. Some such support is essential in the case of the bracket $D^{40}$, which would otherwise, by reason of the weight overhanging rearward from the rod, tend to distort or cramp the shaft of the brush in its bearings.

It is obvious that for the fixed brush there might be substituted a simple backing or support, against or upon which the fish or other object might rest while being moved past the operating brush, the process being repeated to clean each side separately, and that, in addition to the active function of cleaning or scraping, each brush sustains to the other brush the relation which constitutes it a backing or support for the object to be operated upon by the other brush.

For domestic use, I construct a simple machine having a single rotary brush mounted over against, or in opposition to, the base or back on or against which the fish or other object may rest while the brush operates upon it. The most convenient form of such machine is one in which the base is horizontal and the brush mounted above it and adapted to be used by drawing the fish or other object through endwise from one side to the other. Such a machine is represented in Fig. 9, and involves some specific features which are not essential to the duplex machine,— that is, a machine having two rotary brushes, but which involve also the generic features which distinguish the invention, as embodied in the duplex machine. This domestic form of machine is the form shown in my application, Serial No. 405,126, filed September 8, 1891, and the specific features thereof are therefore not claimed in this application.

I claim—

1. In a bristle or scale detaching machine, the scraping combs comprising each a back or rib which is elastic both torsionally and flexibly, and rigid teeth projecting from such elastic back: substantially as set forth.

2. In a bristle or scale detaching machine, a rotary brush consisting of a series of scraping combs arranged in cylindrical order about the axis of the brush, and comprising each a back or rib which is elastic both torsionally and flexibly, and rigid teeth projecting from such elastic back: substantially as set forth.

3. In a scale or bristle detaching machine, a rotary brush consisting of scraping combs arranged in cylindrical order about the axis of the brush, and consisting each of a rubber rod or bar and wire teeth embedded therein, and projecting therefrom approximately radially with respect to the brush: substantially as set forth.

4. In a scale or bristle detaching machine, a rotary brush comprising combs arranged in cylindrical order about the axis of the brush, and consisting each of a flexible back and rigid teeth projecting from the back, such teeth being bent at the ends and serrated on the outer side of the bend: substantially as set forth.

5. In a scale or bristle detaching machine, in combination with a supporting frame, two rotary brushes having their axes parallel and provided with means for rotating them simultaneously in their bearings; each brush comprising a series of scraping combs arranged in cylindrical order about the axis of the brush, said combs consisting each of a rib or back which is elastic both flexibly and torsionally, and rigid teeth projecting from such elastic back approximately radially with respect to the brush: substantially as set forth.

6. In a scale or bristle detaching machine, in combination with the frame, a rotary brush journaled in horizontal bearings thereon and adapted to scrape the object subjected to its action; a draft band or chain operating vertically in a plane substantially tangential to the brush, and a gripper at the lower end of such draft chain whereby the object may be impelled tangentially with respect to the brush in contact therewith: substantially as set forth.

7. In a scale and bristle detaching machine, in combination with a frame, a pair of rotary brushes journaled thereon in parallel horizontal bearings, having scraping teeth or fingers, and a draft band or chain depending vertically between the brushes, and a gripper at the lower end of such draft chain, and suitable means for actuating the chain longitudinally upward, whereby an object held between the grippers may be impelled tangentially with respect to the brushes between the same and exposed to them respectively at opposite sides simultaneously: substantially as set forth.

8. In a bristle or scale detaching machine, a rotary brush consisting of a series of scraping combs arranged in cylindrical order about the axis of the brush, comprising each a flexibly and torsionally elastic back or rib and rigid teeth projecting therefrom, in combination with a suitable support or backing for the object to be operated upon, the brush being movable bodily at will toward and from the support or backing: substantially as set forth.

9. In a scale or bristle detaching machine, in combination with the rotary brushes of the character set forth, one of said brushes having its bearings fixed and the other having its bearings movable toward and from the first; the horizontal rock shaft on the frame and suitable connections from the same to the movable bearings; said rock shaft having two lever arms extending in opposite directions and adapted to receive the stress of the weight or spring connected to either of them at preference; whereby the movable brush may normally be held away from or toward the other brush at the will of the operator: substantially as set forth.

10. In a bristle or scale detaching machine, in combination with the frame, a pair of rotary brushes journaled thereon in parallel horizontal bearings, the bearings of one of said brushes being fixed and the bearings of the other brush being movable toward and from the first brush; a horizontal rock shaft on the frame and suitable connections from the same to the movable journal boxes respectively, whereby the rocking of the shaft slides the boxes, said rock shaft being subject to a continuous stress tending to rock it in a direction to force the movable brush toward the fixed brush, and provided with a handle by which it may be operated at will: substantially as set forth.

11. In combination with the frame and the brushes journaled thereon in horizontal parallel bearings, the bearings of one brush being fixed and the other movable toward and from the fixed brush; the beveled gears on the shafts of the brushes respectively; the horizontal shaft F journaled on the frame and having on it beveled gears which mesh with and drive the gears on the shafts and brushes respectively; the gear which drives the movable brush being feathered on the shaft, and one journal bearing of the movable brush having stops which engage said feathered gear to slide it on its shaft: substantially as set forth.

12. In combination, substantially as set forth, the two parallel rotary brushes, the journal bearings of the one being fixed and of the other being movable; the gears on their shafts respectively, and the counter-shaft from which they derive motion, the bearing of the movable brush at the geared end and of the counter shaft at the corresponding end being obtained in one rigid yoke or frame, and the gear on the counter-shaft which drives the movable brush being feathered on said shaft and stopped endwise between the bearings of the shaft on said yoke or frame: substantially as set forth.

13. In combination with the two parallel rotary brushes, the counter-shaft and intermeshing beveled gear by which they are driven; the shaft $k$ at right angles to said counter-shaft; the wheel thereon adapted to operate the feeding device; a beveled gear at the end of said shaft; a pair of beveled gears loose on the counter-shaft meshing with the gear on the shaft $k$, and provided on the facing ends of their hubs, respectively, with clutch teeth; a double clutch feathered on the shaft between said toothed hubs; and suitable shipping devices for throwing it into engagement with either of said gears, whereby the feed shaft $k$ is rotated in one direction or the other, according to the engagement of said clutch, without change in the rotation of said brushes: substantially as set forth.

14. In combination with the parallel rotary brushes, the draft chain or strap J and the guide over which it passes located above the interval between the brushes; a shaft $k$ journaled on the frame parallel to the brushes, and a sprocket wheel therein adapted to engage the draft chain or band; the counter-shaft and the beveled gears by which it drives the brushes; the beveled gears loose on the counter-shaft and the beveled gear on the shaft $k$, which meshes with them, and the clutch feathered on the counter-shaft between them; the shifting lever or fork for shifting the clutch, and the horizontal rods $L^4$ extending therefrom and provided with the abutment $L^{40}$, the vertically operated rods $R'$ and $R^2$ having cams adapted to engage said abutment; the levers $P'$ and $P^2$, which operate said rods respectively, having loops or eyes through which the two plies of the draft chain pass respectively; and the adjustable knots on said chain, whereby the movement of the chain to either limit determined by the knots operates the clutch to disengage it from its driving gear: substantially as set forth.

15. In combination with the parallel rotary brushes, the hoisting or draft chain and the grippers swiveled to the end of the same, the swivel head and the handle of the gripper to which it is connected having respectively grooves and projections adapted to become engaged by the downward stress of the gripper at either of the two positions which are ninety degrees apart about the swivel axis: substantially as and for the purpose set forth.

In testimony whereof I have hereunto set my hand, in the presence of two witnesses, at Chicago, Illinois, this 7th day of July, 1892.

JOHN TOBIN.

Witnesses:
CHAS. S. BURTON,
JEAN ELLIOTT.